(12) United States Patent
Liu et al.

(10) Patent No.: US 9,336,006 B2
(45) Date of Patent: May 10, 2016

(54) HIGH-PERFORMANCE PARALLEL TRAFFIC MANAGEMENT FOR MULTI-CORE PLATFORMS

(71) Applicant: Futurewei Technologies, Inc., Plano, TX (US)

(72) Inventors: Deming Liu, San Jose, CA (US); Xiaoyong Yi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 219 days.

(21) Appl. No.: 14/027,387

(22) Filed: Sep. 16, 2013

(65) Prior Publication Data

US 2015/0082319 A1    Mar. 19, 2015

(51) Int. Cl.
| | |
|---|---|
| *G06F 9/38* | (2006.01) |
| *H04L 12/54* | (2013.01) |
| *G06F 9/50* | (2006.01) |
| *H04L 12/873* | (2013.01) |
| *H04L 12/815* | (2013.01) |
| *H04L 12/863* | (2013.01) |
| *H04L 12/851* | (2013.01) |
| *G06F 9/46* | (2006.01) |

(52) U.S. Cl.
CPC ............ *G06F 9/3851* (2013.01); *G06F 9/5038* (2013.01); *H04L 12/5693* (2013.01); *H04L 47/22* (2013.01); *H04L 47/2441* (2013.01); *H04L 47/52* (2013.01); *H04L 47/6225* (2013.01); *G06F 2209/5021* (2013.01)

(58) Field of Classification Search
None
See application file for complete search history.

(56) References Cited

U.S. PATENT DOCUMENTS

| 6,338,078 B1 * | 1/2002 | Chang et al. ............ 718/102 |
| 2004/0213156 A1 * | 10/2004 | Smallwood et al. ........ 370/232 |
| 2013/0044755 A1 | 2/2013 | Liu et al. |

FOREIGN PATENT DOCUMENTS

WO    2013/025703 A1    2/2013

* cited by examiner

*Primary Examiner* — Eric C Wai
(74) *Attorney, Agent, or Firm* — Conley Rose, P.C.; Grant Rodolph; Adam J. Stegge (57) ABSTRACT

A method of traffic management implemented in a multi-core device comprising a first core and a second core, the method comprising receiving a first plurality of data flows for the first core and a second plurality of data flows for the second core, assigning a first thread running on the first core to the first plurality of data flows, assigning a second thread running on the second core to the second plurality of data flows, processing the first plurality of data flows using the first thread, and processing the second plurality of data flows using the second thread, wherein at least one of the first plurality of data flows and at least one of the second plurality of data flows are processed in parallel.

20 Claims, 4 Drawing Sheets

HIGH-PERFORMANCE PARALLEL TRAFFIC MANAGEMENT FOR MULTI-CORE PLATFORMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications networks comprise network devices that transport data through a network. The network devices may include routers, switches, bridges, or combinations thereof that transport individual data packets or frames through the network. A device may forward a plurality of packets that correspond to different sessions or data flows. The packets of different sessions or flows can be received over a plurality of ingress ports and forwarded over a plurality of egress ports of the device. Additionally, the packets in different flows for different users may be queued or cached in corresponding buffers for some time before being processed by the device. One or more traffic schedulers and/or shapers may be used in a network device to coordinate processing and forwarding of the incoming packets for different users.

Traffic management (TM) of data flows may be accomplished by architectures that facilitate a purely or primarily hardware implementation, e.g., using application specific integrated circuits (ASICs). Such architectures may be referred to as "hardware TM". On the other hand, TM may be accomplished by architectures that are a combination of hardware and software, and such architectures may be referred to as "software TM." Although faster than software TM, hardware TM may have potential disadvantages. For example, hardware TM may require hardware management buffers, which may be more expensive than, e.g., double data rate (DDR) memories. On the other hand, DDR memories may be used in software TM, which may be more flexible than hardware TM.

However, the performance of software TM may be sensitive to central processing unit (CPU) resources, thus insufficient or depleting CPU resources may cause a decline in throughput. Further, the implementation of today's packet scheduling may be limited to a single thread, thus a throughput may drop as the number of packet flows increase. These current implementations may need modifications to accommodate implementation in a multi-core environment, which is now widely used in communication systems.

SUMMARY

In at least one example embodiment, traffic management is implemented in a multi-core device. For example, a first plurality of data flows may be received for a first core, and a second plurality of data flows may be received for a second core. A first thread running on the first core may be assigned to the first plurality of data flows, and a second thread running on the second core may be assigned to the second plurality of data flows. Further, the first plurality of data flows may be processed or serviced using the first thread, and the second plurality of data flows may be processed using the second thread. At least one of the first plurality of data flows and at least one of the second plurality of data flows may be processed concurrently or in parallel. The embodiment may improve the performance and scalability of the buffer architecture, which may have a large number of cores and need to handle a large number of data flows.

Disclosed example embodiments may allow integrated scheduling and shaping of network data traffic. Specifically, one or more buffers may be configured to cache the plurality of data flows for the plurality of cores, wherein one or more of the data flows are cached for each of the plurality of cores. Each of a plurality of schedulers may be configured to schedule one or more of the data flows to be processed by one of the plurality of cores. An additional scheduler may be configured to assign a plurality of threads to the plurality of cores for processing the data flows, wherein at least two of the threads are concurrently assigned by the additional scheduler to at least two of the cores.

Disclosed example embodiments may enable concurrently assignment of incoming data flows for processing by a plurality of cores. A plurality of packet flows may be received at a plurality of processing cores, wherein one or more packet flows are received at each of the plurality of processing cores. A plurality of threads may be assigned to the plurality of processing cores. Further, the plurality of packet flows may be processed using the plurality of threads, wherein at least two of the plurality of threads are concurrently used in processing the plurality of packet flows.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure introduces an efficient hierarchical traffic management (TM) solution for a multi-core platform by taking performance and scalability into account. Specifically, example embodiments of a multi-level TM buffer hierarchy are disclosed herein. The example embodiments may employ available buffer mechanisms such as ring buffers, linked list, etc., in a novel way. In a system comprising a plurality of hardware or logical cores, a plurality of threads may be assigned to a plurality of cores to concurrently execute data flows. The TM buffer may be realized using lockless operations, thus eliminating a need for locks. Example embodiments disclosed herein may enable high-performance traffic scheduling implemented concurrently on a multi-core platform. Further, example embodiments may alleviate memory access latencies, which may exist in both software and hardware TM and affect their performance. Further, example embodiments disclosed herein may accommodate more data flows using relatively cheap memories such as double data rate (DDR) memory and may be implemented using software TM.

Figure 1:
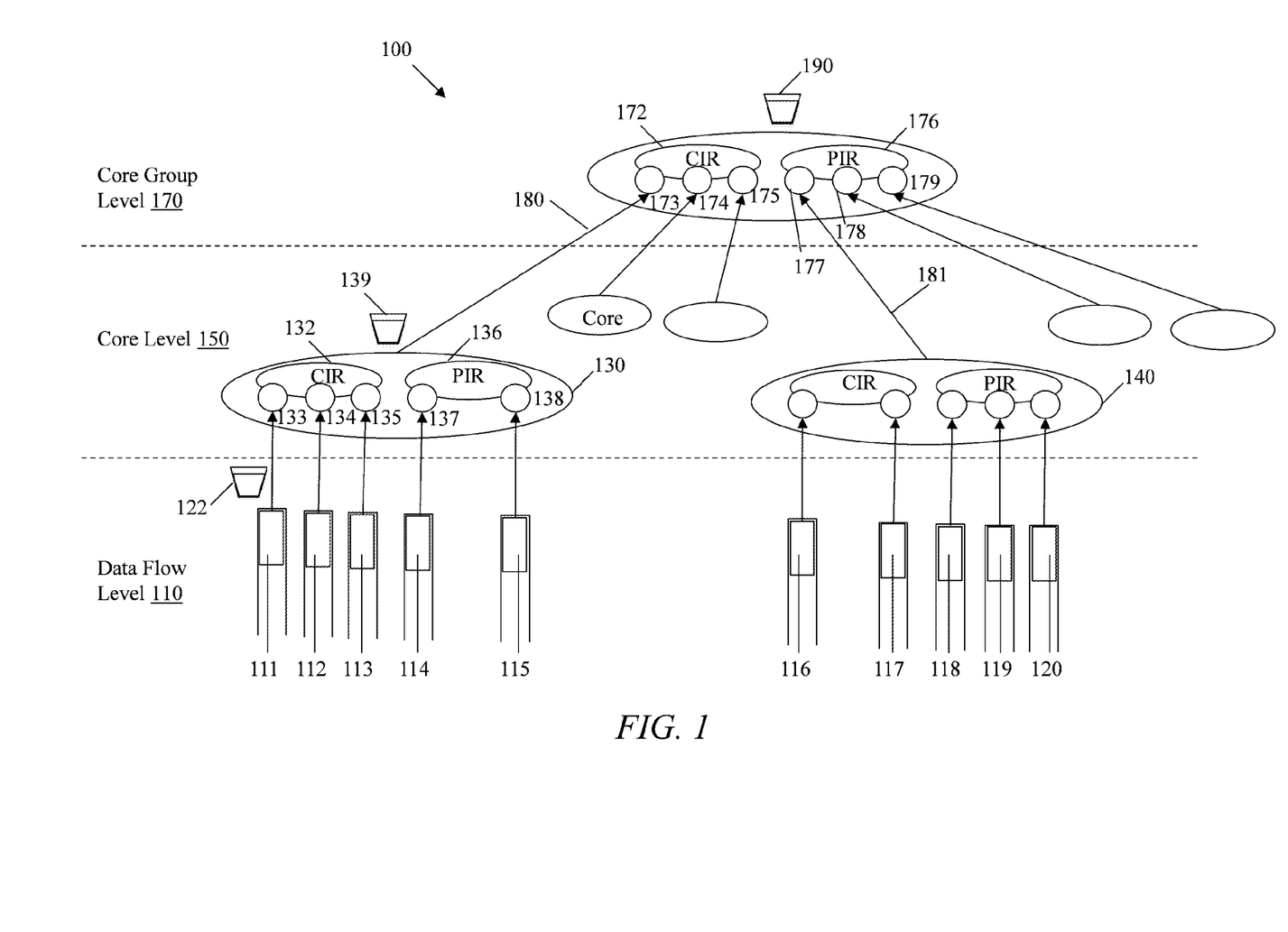
FIG. 1 illustrates an example embodiment of a multi-level traffic management (TM) buffer architecture.

FIG. 1 illustrates an example embodiment of a multi-level TM buffer architecture 100, in which disclosed scheduling and shaping methods may be implemented on each level. The architecture or hierarchy 100 may be configured to process incoming data traffic comprising flows of packets or frames. For example, the architecture 100 may be located between one or more sources such as a user equipment (UE) and a destination such as a service provider, so that data traffic from the sources may be delivered by the architecture 100 to the destination.

The architecture 100 may be implemented in a multi-core network device or component, such as a router, bridge, switch, switch fabric, line card, network interface on server, or other components configured to forward packets or frames in a network. Packets may belong to different sessions or flows that may be received or generated at the network component. Alternatively, the architecture 100 may be implemented in a plurality of network components that may be coupled in a multi-layer or multi-level hierarchy, such as in a tree topology. As such, packets may belong to different sessions or flows that may be forwarded along the network components on the different levels.

A plurality of cores may be included in the architecture 100, and the cores may be implemented using any suitable technique, such as hardware processing cores (e.g., a central processing unit (CPU)), virtual or logical cores (e.g., in virtual machines), or both. Each of the cores may correspond to a user of the architecture 100. As shown in FIG. 1, the architecture 100 may comprise three levels or layers, including a data flow level 110, a core level 150, and a core group level 170, which may coordinate with one another to enable concurrent processing of multiple threads on multiple cores. In an example embodiment, traffic shaping may be implemented on all three levels, while scheduling may be implemented on the core level 150 and the user group level 170.

On the data flow level 110, a plurality of data flows may be received or generated by the architecture 100 for use by a plurality of cores. For example, data flows 111-115 may be received to service a core 130, and data flows 116-120 may be received to service a core 140. Each data flow may comprise one or more packets in queues (thus data flow may also be referred to as packet queue or packet flow). The packets in turn may comprise data frames and other types of frames. The data flows 111-115 may be stored in one or more buffers, e.g., with each data flow stored in one buffer. Further, a core such as the core 130 or 140 may be assigned a thread, so that the thread may run on the core to handle data traffic for a particular service. A thread may be a program or a sequence of programmed instructions that may be managed by a scheduler and assigned to a core.

To implement TM of the data flows, a traffic shaper 122 may be used on the data flow level 110, which may use various shaping methods. As an example, according to a three-color shaping scheme, a shaper may mark a data flow to green, yellow, or red depending on a data rate configured for its corresponding core. Take the marking of the data flow 111 by the shaper 122 as an example, with the understanding that other shaper(s) may use the same or a similar shaping scheme to mark other data flow(s). In an example embodiment, if a total data rate arriving at the core 130 does not exceed a pre-configured committed information rate (CIR) allocated to the core 130 (in other words, the core 130 has capability to handle more flows), the data flow 111 may be marked green and placed in a CIR queue 132. In implementation, a node comprising a descriptor for packet or packets in the data flow 111 may be added to the CIR queue 132. Accordingly, the data flow 111 may be processed directly by the core 130 without any hold up in time. Otherwise if the total data rate arriving at the core 130 exceeds the CIR but not a pre-configured peak information rate (PIR) allocated to the core 130, the data flow 111 may be marked yellow, which indicates that the data flow 111 may be placed into a PIR queue 136. Otherwise if the data rate exceeds the PIR, the data flow 111 may be marked red, which indicates that the data flow 111 may be temporarily held up, for a pre-determined period, by the shaper 112 and not placed into any queue. When the shaper 112 holds up a data flow, a timer may be initiated such that after the pre-determined time period (length depends on implementation), the data rate of the core 130 may be checked again. The data flow held up may be enqueued to either a CIR or PIR queue.

Note that any of the CIR and PIR queues disclosed herein may be implemented as any suitable data structure and stored in any suitable memory location, such as in a ring buffer or a linked list. For example, for the core 130 on the core level 150, the CIR and PIR queues 130 and 136 are illustrated as circular or ring buffers in FIG. 1. Further, on the core level 150, each CIR or PIR queue may comprise a number of nodes, each of which may contain information that indicates or specifies a data flow or packets in the data flow. For example, the CIR queue comprises nodes 133, 134, and 135 (can be any other number of nodes), wherein the node 133 may comprise packet descriptors for packets belonging to the data flow 111. Note that the number of nodes in different queues may or may not be equal.

The operation of the CIR and PIR queues may be managed by a scheduler and shaper together. A queue may update its nodes using a round-robin algorithm or method. More specifically, a new node added to the CIR queue may be added to the tail of the queue. A head of the queue may be served first, after which the head node may be removed if it becomes empty or may be moved to the tail of the queue if the head node is still not empty.

The CIR queue 132 has higher priority than the PIR queue 136, therefore nodes in the PIR queue 136 may be serviced after the CIR queue 132 becomes empty. In operation, after each servicing of a PIR node in the PIR queue 136, a shaper 139 for the core 130 may check the CIR queue 132 to determine whether it is empty.

Similar to the core level 150, on the core group level 170, a CIR queue 172 and a PIR queue 176 may be designed, e.g., as ring buffers or linked lists. Using ring buffer as an example, the CIR queue 172 comprises core nodes or user nodes 173, 174, and 175, while the PIR queue comprises user nodes 177, 178, and 179. Each of the user nodes may specify or indicate a corresponding core. A thread may be assigned a user node in a core group and may take time to service a core corresponding to the user node. For example, a thread 180 may be assigned to the user node 173 and services the core 130, while another thread 181 may be assigned to the user node 177 and services the core 140. Moreover, after assignment a user node may be dequeued or removed from a queue. Since each thread may get a user node that is removed from a queue (e.g., queue 172 or 176) by assignment or polling, multiple threads for multiple nodes may run in parallel in multiple processing cores. Accordingly, multiple user nodes may be dequeued from the CIR or PIR queue simultaneously, and multiple threads can service multiple cores in parallel such that each thread may service one core. Thus, the present disclosure may increase system performance by employing multi-cores and multi-threads to schedule packets in parallel.

After getting a user node, a thread may service a plurality of flows in the user node. For example, the thread 180 for core 130 may service the data flows 111-115, each of which may have its own shaper. The shaper 139 in turn may govern traffic of the core 130. In use, the top layer scheduling threads (e.g., thread 180 and 181) may invoke service scheduling of packets for each bottom layer node. The threads may also poll to dequeue bottom layer nodes and process each user concurrently.

Similar to the data flow level 110, traffic shaping on the core level 150 may also use a three-color scheme, in which a shaper 139 may mark the core 130 to green, yellow, or red depending on a data rate of the core 130. Note that, since at a given time, the core 130 may service one data flow, the data rate of the core 130 equals the data rate of a data flow (e.g., the data flow 111). If the data rate of the core 130 does not exceed a pre-configured CIR, the core 130 may be marked green, which indicates that the core 130 may be serviced directly without any hold up. Otherwise, if the data rate exceeds the CIR but not a pre-configured PIR, the core 130 may be marked yellow, which indicates that the data flow may be placed into the CIR queue 172. Otherwise, if the data rate exceeds the PIR, the data flow may be marked red, which indicates that the data flow may be placed into the PIR queue 176.

The shapers 122, 139, and 190 on the different levels may be implemented as separate modules or units, or alternatively as parts of one module, e.g., a committed access rate (CAR) module. In use, selected packet(s) in a data flow may be sent to a CAR module to check CIR and PIR observance for three levels (data flow level 110, core level 150 and core group level 170). For example, based on the observance, on the core group level 170, if a data rate exceeds the PIR, a corresponding node may be removed from the PIR queue 176, and a timer may be started to determine when the corresponding node may rejoin the PIR queue 176. Otherwise if the data rate is in the range of CIR and PIR, the corresponding node may be moved from the CIR queue 172 to the PIR queue 176. Otherwise if the data rate is no more than the CIR, the corresponding node may be moved from the PIR queue 176 to the CIR queue 172. Further, if a node in the CIR queue 172 or PIR queue 176 is empty, the node may be removed or deleted.

Shaping results may be recorded for a data flow comprising packet(s) to avoid sending the data flow to a shaper again. Further, when being serviced, a node (e.g., on the core level or core group level) may be marked as being serviced and the scheduler may be blocked at this node in the next round if this service has not been done (in other words, the scheduler may wait until the service is done). Alternatively, after being serviced a node may be removed temporarily from its queue. Moreover, a core may run a thread such that the thread traverses the multiple data flows arrived at the core.

Figure 2:
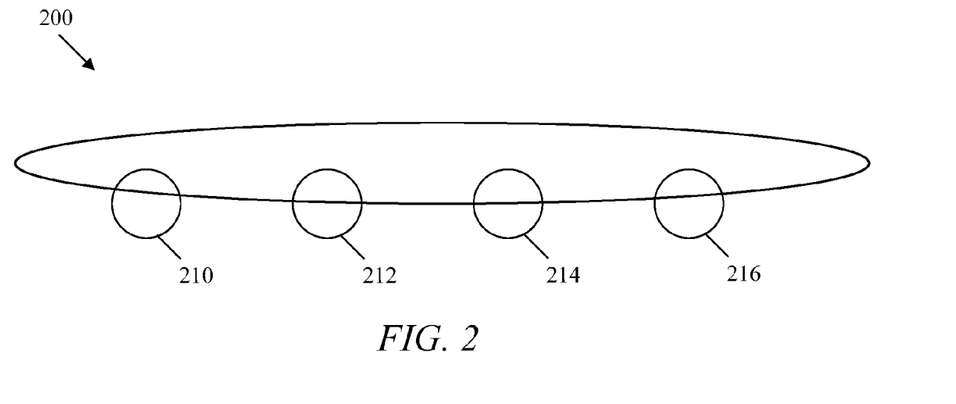
FIG. 2 illustrates an example embodiment of a ring buffer queuing implementation.

FIG. 2 illustrates an example embodiment of a ring buffer queue 200, which may be used in a TM buffer architecture (e.g., the architecture 100). The queue 200 may be stored in a ring buffer and may comprise a number of nodes 210, 212, 214, and 216, wherein the node 210 is a head node and the node 216 is a tail node. The queue 200 may update its nodes using a round-robin algorithm, which may start from the head node of the queue 200, update the queue 200, and then start from the head node again. For example, the head node 210 may be serviced first, after which the queue 200 may be updated. During updating, the head node 210 may be removed if it becomes empty (i.e., node 212 becomes the new head node); otherwise if the head node 210 is still not empty, the head node 210 may be moved to the tail of the queue 200, i.e., after the tail node 216. If a new node is to be added to the queue 200, the new node may be added to the tail of the queue 200, i.e., after the tail node 216, and may become the new tail node. In use, multiple threads may enqueue and/or dequeue the same queue 200 in a lock-free way, e.g., by using compare-and swap-(CAS) instructions.

Note that the queue 200 may be a CIR or PIR queue, and may be implemented on the core level or core group level. For example, referring back to FIG. 1, the core 130 may have the CIR queue 132 and the corresponding PIR queue 136, both of which may use the queuing queue 200. More specifically, the head node of the CIR queue 132 may be serviced, after which the head node may be deleted from the queue 132 if the head node becomes empty, or may be moved to the tail of the CIR queue 132 if the head node remains non-empty. Further, after servicing, the head node of the CIR queue 132 may be moved to the corresponding PIR queue 136 if the pre-configured CIR is satisfied. Nodes in a round-robin implementation may be assigned a weight, e.g., for sharing a total available bandwidth, and the weighted round-robin implementations may be realized with a low $O(1)$ complexity.

The overhead of scanning empty buffers and nodes may be reduced by using dynamic buffer and node management disclosed herein. Specifically, nodes corresponding to non-empty data flows may be enqueued, while empty buffers and nodes may be removed from the hierarchical queue architecture (e.g., when a data flow turns from back-logged to empty). Nodes may rejoin when they turn from empty to back-logged. As a result, the buffer system may achieve better scalability in terms of supporting a larger number of data flows.

On the core layer, a node joining event may be triggered by the arrival of one or more packets in a queue, or by the awakening of a node after being held up for some time (e.g., by a shaper). On the other hand, a node may leave (i.e., leaving event) when the node is serviced to empty, or when the node is set by a shaper to sleep for a period of time. In operation, scheduling may be started when the first node joins in a queue on the core group layer and may run until empty all nodes on the core group layer are emptied.

With continuous removal and insertion of nodes into a queue, race conditions may occur when an empty node is being removed from the queue, while almost at the same time (or within a given time, which is a relatively short period whose length depends on implementation), the node may need to be added to the queue. This scenario may occur, for example, when the last packet in a buffer is being serviced and dequeued, while a new packet arrives to the buffer. In a race condition, it may be necessary to determine whether the node is empty or not. In an example embodiment, 2-layer CAS operations may be used to cover race conditions. CAS instructions may be atomic instructions used in multithreading to achieve lock-free access of the queue. Using a CAS instruction instead of operating system (OS) locks (e.g., spinlock or mutex) may help improve computational efficiency of the system.

In use, an example embodiment of a disclosed parallel TM scheme may be tested in a network device or computer system, such as an x86 platform. To evaluate the performance of parallel TM, simulations were performed using data flows arriving at ingress ports denoted as Port 0 and Port 1, both of which were directed to an egress port denoted as Port 2. TM was enabled at the egress direction of Port 2, and the data flows had a maximum transmission rate of 9.62 Giga bits per second. The weight of the core layer was set to 32, and the weight of the data flow layer was set to 4. Further, TM loop delay was 10 microseconds (µs). Table 1 shows testing results, which illustrates the relationship between the performance, measured as throughput of the egress port (Port 2), and configuration, measured in number of logical cores (from 1 to 6) and number of queues. Due to the multi-level hierarchy disclosed herein, the number of queues, denoted as A×B (e.g., 10×8), indicates that the core level has A queues and the data flow level has B queues.

TABLE 1

Simulation result showing throughput versus number of packet queues and number of logical cores

| Queues | Cores | | | | | |
|---|---|---|---|---|---|---|
| | 1 | 2 | 3 | 4 | 5 | 6 |
| 10 × 8 | 7.01 | 9.62 | 9.62 | 8.52 | 4.76 | 4.11 |
| 50 × 8 | 6.57 | 9.62 | 7.54 | 5.14 | 3.57 | 6.20 |
| 100 × 8 | 6.65 | 9.62 | 9.62 | 3.98 | 7.04 | 5.16 |
| 200 × 8 | 6.65 | 9.62 | 7.08 | 3.66 | 4.02 | 4.92 |
| 400 × 8 | 6.63 | 9.62 | 8.67 | 7.02 | 4.99 | 5.45 |
| 600 × 8 | 6.13 | 9.61 | 6.30 | 4.86 | 2.89 | 4.29 |
| 800 × 8 | 5.11 | 9.29 | 9.62 | 4.69 | 3.12 | 4.20 |
| 1000 × 8 | 4.25 | 7.69 | 9.62 | 3.98 | 5.53 | 5.12 |
| 1500 × 8 | 3.00 | 5.44 | 7.02 | 6.22 | 3.57 | 3.87 |
| 2000 × 8 | 2.33 | 4.26 | 5.45 | 4.66 | 3.28 | 2.56 |

From Table 1, it can be seen that the throughput may initially increase with the number of logical cores due to the advantage of parallel computation. However, as the number of logical cores continue to increase, the throughput may start to decline, which may be caused by increasing overhead of shaping and scheduling in a large number of cores.

Figure 3:
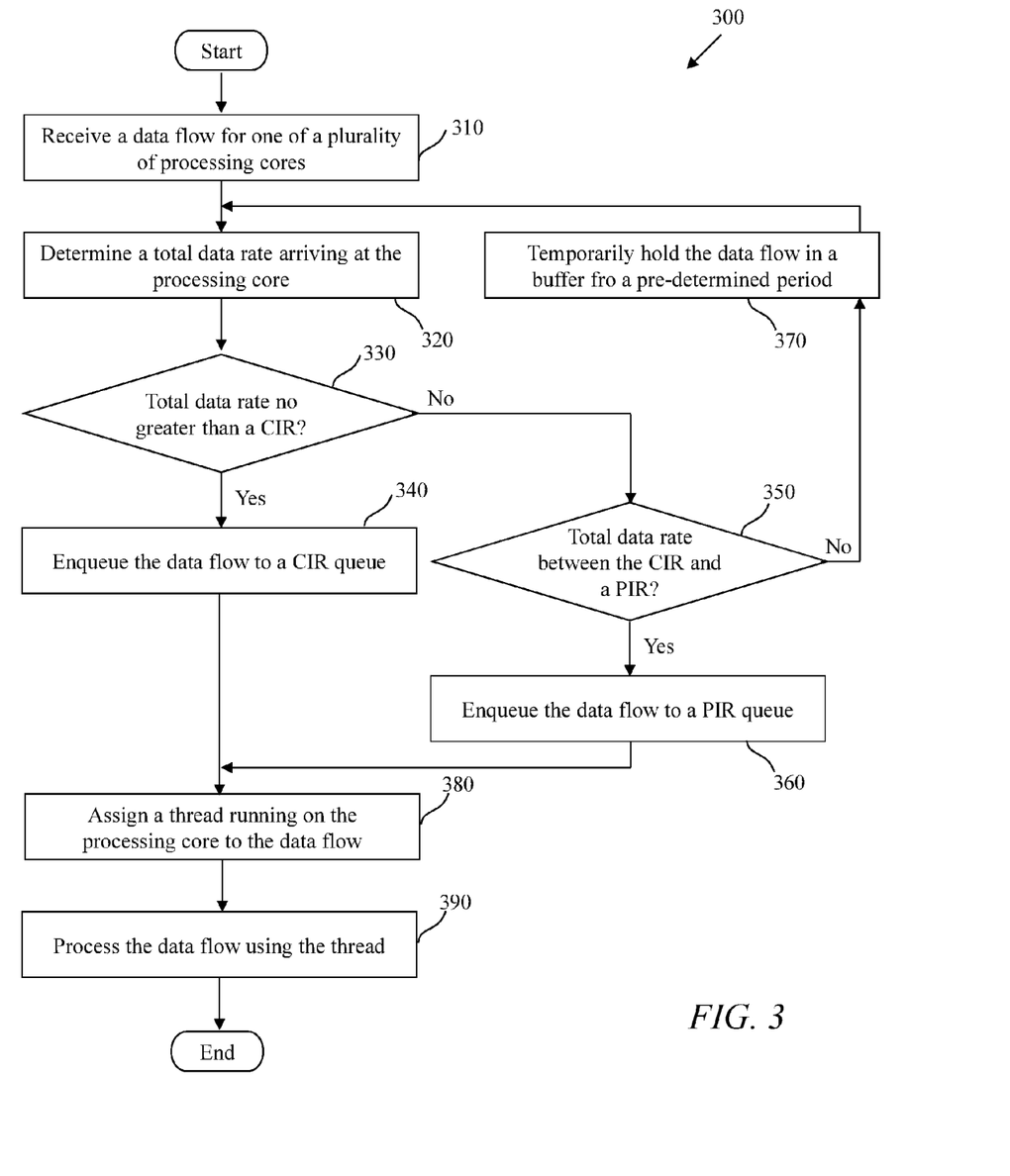
FIG. 3 illustrates an example embodiment of a TM method.

FIG. 3 illustrates an example embodiment of a TM method 300, which may be implemented in a multi-core buffer architecture (e.g., the architecture 100). As described above, multiple data flows may be processed, in parallel, by multiple threads assigned to multiple processing cores in the buffer architecture. In the interest of clarity, one of the data flows, processing cores, and threads, etc., may be given in the method 300 as an example to demonstrate the principle of TM performed on data flows. One of ordinary skill in the art will recognize that the same or similar principle can be extended to multiple data flows and processing cores.

The method 300 starts in step 310, in which a data flow may be received by the buffer architecture. The data flow may be stored in a buffer located within or coupled to one of the processing cores in the buffer architecture. Note that the processing core may be implemented in any suitable form, e.g., as a hardware core or a logical core. In step 320, a traffic shaper located in the buffer architecture may determine a total data rate arriving at the processing core. In step 330, the method 300 may determine whether the total data rate is no greater than a CIR, which may be pre-configured for the processing core. If the condition in the step 330 is met, the method 300 proceeds to step 340, in which the data flow may be enqueued to a CIR queue. Otherwise, the method 300 proceeds to step 350.

In step 350, the method 300 may determine whether the total data rate is between the CIR and a PIR, which may also be pre-configured for the processing core. If the condition in the step 350 is met, the method 300 proceeds to the step 360, in which the data flow may be enqueued to a PIR queue. Otherwise, the method 300 proceeds to step 370, in which the data flow may be temporarily held in a buffer for a pre-determined period. A timer may be started, and after the pre-determined period has been reached, the method 300 may check the total data rate arriving at the processing core again, and determine, based on the checking, whether to enqueue the held-up data flow to the CIR or PIR queue, or to keep holding the data flow.

In step 380, the method 300 may assign a thread running on the processing core to the data flow. In step 390, the data flow may be processed or serviced using the assigned thread. Since the data flow may be received, either concurrently or in series, with other data flows for the same processing core, the plurality of data flows may be processed by the core, one at a time. Further, for other processing cores present in the buffer architecture, additional data flows may be received as well. Based on the parallel TM capability taught herein, different data flows arriving at multiple processing cores may be concurrently assigned with threads, and concurrently processed by the threads. It should be understood that, parallel processing does not entail that all data flows need to be processed concurrently. In an example embodiment, at least one data flow for a first core and at least one data flow for a second core may be processed in parallel.

Overall, this disclosure may enable high performance traffic management (TM) on a multi-core platform by allowing parallel scheduling and servicing of multiple threads on multiple cores. The parallel scheduling implementation may improve TM throughput and save cost on cost-sensitive platforms, such as Gateway GPRS (general packet radio service) Support Node (GGSN), access router (AR), and so forth. Packet scheduling and shaping are integrated herein, which may help saving memory. In addition, software TM disclosed herein may increase platform flexibility in supporting TM.

Figure 4:
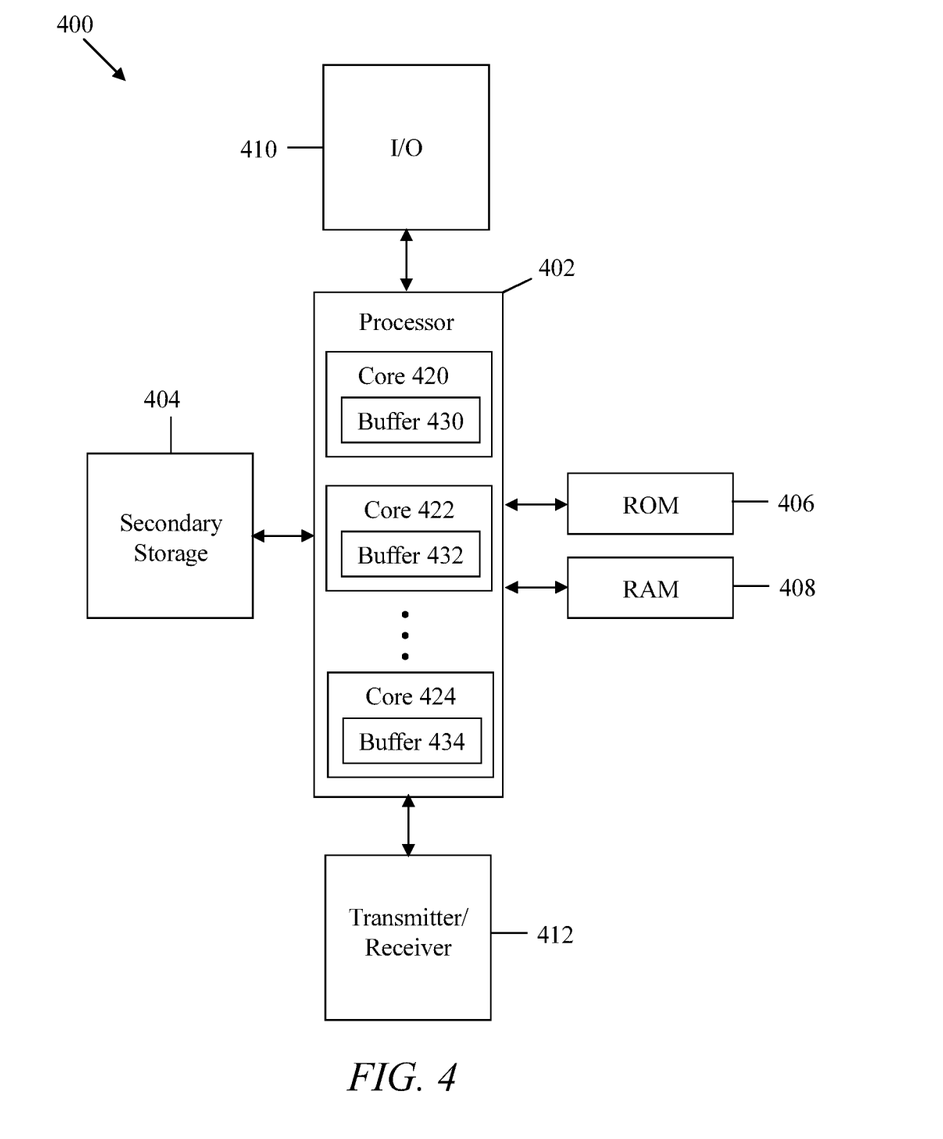
FIG. 4 illustrates an example embodiment of a network device.

FIG. 4 illustrates an example embodiment of a multi-core device 400 suitable for implementing one or more example embodiments of the methods disclosed herein, such as the method 300. Further, components in the multi-core device 400 may be configured to implement any of the apparatuses described herein, such as the multi-level TM buffer architecture 100.

The multi-core device 400 includes a processor 402 that is in communication with memory devices including secondary storage 404, read only memory (ROM) 406, random access memory (RAM) 408, input/output (I/O) devices 410, and transmitter/receiver 412. The processor 402 may comprise a plurality of processing cores, such as cores 420, 422, and 424, which may be hardware core, or virtual or logical cores. Each of the cores may be considered an individual processor, if desired. Threads may be assigned by one or more system schedulers to the cores and run on the cores. The processor 402 may be implemented as one or more central processor unit (CPU) chips, field-programmable gate arrays (FPGAs), application specific integrated circuits (ASICs), and/or digital signal processors (DSPs). The processor 402 may be implemented using hardware or a combination of hardware and software.

A number of buffers, such as buffers 430, 432, and 434 may be used by cores in the processor 402 cache data flows. One or more buffers may be used for the cores. For example, as shown in FIG. 4, each of the cores has a buffer. As described above, the traffic shapers and schedulers on different levels (e.g., core level, core group level) may be implemented in the processor 402, and may use memories (e.g., the secondary storage 404, the ROM 406, and/or the RAM 408), which may be shared by the different cores of the multi-core device 400.

The secondary storage 404 is typically comprised of one or more disk drives or tape drives and is used for non-volatile storage of data and as an over-flow data storage device if the RAM 408 is not large enough to hold all working data. The secondary storage 404 may be used to store programs that are loaded into the RAM 408 when such programs are selected for execution. The ROM 406 is used to store instructions and perhaps data that are read during program execution. The ROM 406 is a non-volatile memory device that typically has a small storage capacity relative to the larger storage capacity of the secondary storage 404. The RAM 408 is used to store volatile data and perhaps to store instructions. Access to both the ROM 406 and the RAM 408 is typically faster than to the secondary storage 404.

The transmitter/receiver 412 may serve as an output and/or input device of the multi-core device 400. For example, if the transmitter/receiver 412 is acting as a transmitter, it may transmit data out of the multi-core device 400. If the transmitter/receiver 412 is acting as a receiver, it may receive data into the multi-core device 400. The transmitter/receiver 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 412 may enable the processor 402 to communicate with an Internet or one or more intranets. I/O devices 410 may include a video monitor, liquid crystal display (LCD), touch screen display, or other types of display. I/O devices 410 may also include one or more keyboards, mice, or track balls, or other well-known input devices.

It is understood that by programming and/or loading executable instructions onto the multi-core device 400, at least one of the processor 402, the secondary storage 404, the RAM 408, and the ROM 406 are changed, transforming the multi-core device 400 in part into a particular machine or apparatus (e.g., disclosure multi-core buffer architecture as taught by the present disclosure). The executable instructions may be stored on the secondary storage 404, the ROM 406, and/or the RAM 408 and loaded into the processor 402 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one example embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. A method of traffic management implemented in a multi-core device comprising a first core and a second core, the method comprising:
   receiving a first plurality of data flows for the first core and a second plurality of data flows for the second core;
   assigning a first thread running on the first core to the first plurality of data flows;
   assigning a second thread running on the second core to the second plurality of data flows;
   processing the first plurality of data flows using the first thread; and
   processing the second plurality of data flows using the second thread,
   wherein at least one of the first plurality of data flows and at least one of the second plurality of data flows are processed in parallel,
   wherein the first plurality of data flows are processed, one at a time, following an order determined by a first committed information rate (CIR) queue and a first peak information rate (PIR) queue, wherein the first CIR and PIR queues are coordinated by a first scheduler in the multi-core device,
   wherein the second plurality of data flows are processed, one at a time, following an order determined by a second CIR queue and a second PIR queue, wherein the second CIR and PIR queues are coordinated by a second scheduler in the multi-core device, wherein the first CIR queue has higher priority than the first PIR queue, wherein one or more data flows specified by the first PIR queue are processed only when the first CIR queue is empty, wherein the second CIR queue has higher priority than the second PIR queue, wherein one or more data flows specified by the second PIR queue are processed only when the second CIR queue is empty.

2. The method of claim 1, further comprising:
   after receiving a data flow in the first plurality of data flows, and prior to processing the data flow,
      determining that a data rate arriving at the first core is no greater than a CIR; and
      enqueueing, based on the determining, the data flow to the first CIR queue such that processing of the data flow has higher priority than processing of any data flow specified by the first PIR queue.

3. The method of claim 1, further comprising:
   after receiving a data flow in the first plurality of data flows, and prior to processing the data flow,
      determining that a data rate arriving at the first core is between a CIR and a PIR; and
      enqueueing, based on the determining, the data flow to the first PIR queue such that processing of the data flow has lower priority than processing of any data flow specified by the first CIR queue.

4. The method of claim 1, further comprising:
   after receiving a data flow in the first plurality of data flows, and prior to processing the data flow,
      determining that a data rate arriving at the first core exceeds a PIR;
      temporarily holding, based on the determining, the data flow in a buffer;
      checking, after a pre-determined period, the data rate arriving at the first core; and
      determining, based on the checking, whether to enqueue held-up data flow to the first CIR queue or the first PIR queue, or to keep holding the data flow.

5. The method of claim 1, further comprising:
   after the processing of a packet of a data flow in the first plurality of data flows,
      determining that a node, located in the first CIR queue or the first PIR queue, corresponding to the data flow is empty; and
      removing, based on the determining, the node from the first CIR queue or the first PIR queue.

6. The method of claim 1, further comprising:
   after the processing of a packet of a data flow in the first plurality of data flows,
      determining that a node, located in the first CIR queue or the first PIR queue, corresponding to the data flow is not empty; and
      moving, based on the determining, the node from a head of the first CIR queue or the first PIR queue to a tail of the first CIR queue or the first PIR queue.

7. The method of claim 1, further comprising:
   after processing a last packet of one of the first plurality of data flows,
      determining a race condition indicating that a new packet has been received, within a given time, in a buffer containing the last packet; and
      continuing processing, based on the determining, the new packet via a compare-and-swap (CAS) operation.

8. The method of claim 1, wherein a node comprising a descriptor for at least one packet in the data flow is added to the first CIR queue or the first PIR queue.

9. An apparatus comprising:
   a plurality of cores configured to process a plurality of data flows;
   one or more buffers configured to cache the plurality of data flows for the plurality of cores, wherein one or more of the data flows are cached for each of the plurality of cores;
   a plurality of schedulers assigned to each of the plurality of cores, wherein each scheduler of the plurality of schedulers is configured to schedule one or more of the data flows to be processed by one of the plurality of cores;

an additional scheduler configured to assign a plurality of threads to the plurality of cores for processing the data flows, wherein at least two of the threads are concurrently assigned by the additional scheduler to at least two of the cores; and a plurality of shapers, each of which is configured to manage a committed information rate (CIR) queue and a peak information rate (PIR) queue for each of the plurality of cores, wherein the one or more data flows are processed, one at a time, following an order determined by the CIR queue and the PIR queue, wherein the CIR and PIR queues are coordinated by the scheduler assigned for each of the plurality of cores, wherein the processing of a data flow specified by the CIR queue has a higher priority than the processing of any data flow specified by the PIR queue, wherein one or more data flows specified by the PIR queue are processed only when the CIR queue is empty.

10. The apparatus of claim 9, further comprising an additional shaper coupled to a buffer and configured to determine, when a new packet of a data flow is cached in the buffer, that a total data rate arriving at the core is no greater than a CIR, and wherein scheduling the one or more of the data flows by a scheduler corresponding to the additional shaper comprises enqueueing the data flow to the CIR queue.

11. The apparatus of claim 9, further comprising an additional shaper coupled to a buffer and configured to determine, when a new packet of a data flow is cached in the buffer, that a total data rate arriving at the core is greater than a CIR but no greater than a PIR, and wherein scheduling the one or more of the data flows by a scheduler corresponding to the additional shaper comprises enqueueing the data flow to the PIR queue.

12. The apparatus of claim 9, further comprising an additional shaper coupled to a buffer and configured to determine, when a new packet of a data flow is cached in the buffer, that a total data rate arriving at the core is greater than a PIR, wherein scheduling the one or more of the data flows by a scheduler corresponding to the additional shaper comprises:
   temporarily holding, based on the determining, the data flow in the buffer;
   checking, after a pre-determined period, the data rate arriving at the core; and
   determining, based on the checking, whether to enqueue held-up data flow to
   the CIR queue or PIR queue, or to keep holding the data flow.

13. The apparatus of claim 9, wherein, after processing a packet in one of the plurality of data flows by one of the plurality of cores, a corresponding scheduler is further configured to:
   determine that a node, located in the CIR or PIR queue, corresponding to the data flow is empty; and
   remove, based on the determining, the node from the CIR or PIR queue.

14. The apparatus of claim 9, wherein, after processing a packet in one of the plurality of data flows by one of the plurality of cores, a corresponding scheduler is further configured to:
   determine that a node, located in the CIR or PIR queue, corresponding to the data flow is not empty; and
   move, based on the determining, the node from a head of the CIR or PIR queue to a tail of the CIR or PIR queue.

15. The apparatus of claim 9, wherein, after processing a last packet in one of the plurality of data flows by one of the plurality of cores, a corresponding scheduler is further configured to:
   identify a race condition indicating that a new packet has been received in the same buffer containing the last packet, within a given time after the processing of the last packet; and
   continue processing, based on the identifying, the new packet via a compare-and-swap (CAS) operation.

16. The apparatus of claim 9, wherein a node comprising a descriptor for at least one packet in the data flow is added to the CIR queue or the PIR queue.

17. A computer program product comprising computer executable instructions stored on a non-transitory computer readable medium such that when executed by a processor cause a network device to:
   receive a plurality of packet flows at a plurality of processing cores, wherein one or more packet flows are received at each of the plurality of processing cores;
   assign a plurality of threads to the plurality of processing cores;
   process the plurality of packet flows using the plurality of threads, wherein at least two of the plurality of threads are concurrently used in processing the plurality of packet flows; and
   manage a committed information rate (CIR) queue and a peak information rate (PIR) queue for each of the plurality of processing cores, wherein the plurality of packet flows are processed, one at a time, following an order determined by the CIR queue and the PIR queue, wherein the CIR and PIR queues are coordinated by a scheduler assigned for each of the plurality of processing cores, wherein the processing of a packet flow specified by the CIR queue has a higher priority than the processing of any packet flow specified by the PIR queue, wherein one or more packet flows specified by the PIR queue are processed only when the CIR queue is empty.

18. The computer program product of claim 17, wherein each of the plurality of processing cores is a hardware core or a logical core.

19. The computer program product of claim 17, further comprising instructions that cause the network device to:
   after receiving a packet flow at a processing core;
   determine a total data rate going through the plurality of processing cores; and
   determine, based on the total data rate, whether to assign a thread to the packet flow or to temporarily hold up the packet flow in a buffer within or coupled to the processing core.

20. The computer program product of claim 17, wherein a node comprising a descriptor for at least one packet in the packet flow is added to a first CIR queue or a first PIR queue.

* * * * *